Figure 1:
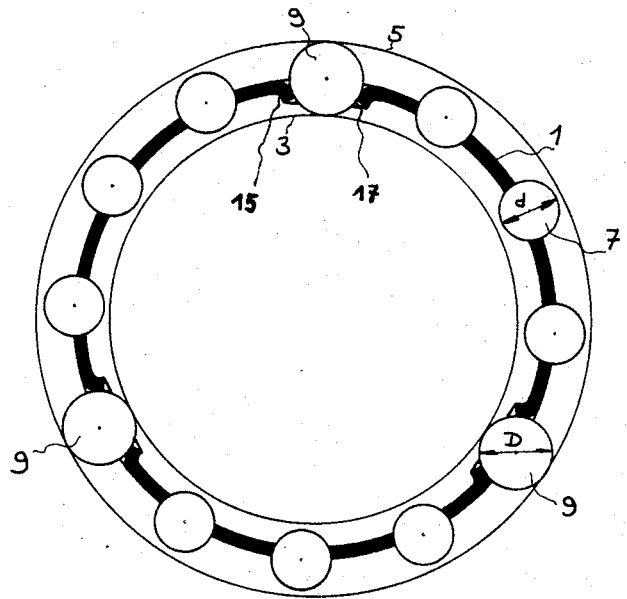

United States Patent [19]

Stephan

[11] Patent Number: 4,505,523

[45] Date of Patent: Mar. 19, 1985

[54] PRESTRESSED ROLLING BEARING DEVICE

[75] Inventor: Gérard Stephan, Croissy, France

[73] Assignee: Nadella, Rueil Malmaison, France

[21] Appl. No.: 540,496

[22] Filed: Oct. 11, 1983

Related U.S. Application Data

[63] Continuation of Ser. No. 256,124, Apr. 21, 1983, abandoned.

[30] Foreign Application Priority Data

Apr. 21, 1980 [FR] France .................. 80 08863

[51] Int. Cl.³ .................. F16C 19/49; F16C 19/56; F16C 33/48
[52] U.S. Cl. .................. 384/445; 384/494; 384/523; 384/520; 384/548
[58] Field of Search ............ 308/177, 201, 217, 188, 308/189 R, 199, 200, 202, 189 A

[56] References Cited

U.S. PATENT DOCUMENTS

| | | | |
|---|---|---|---|
| 2,724,624 | 11/1955 | Barr | 308/200 |
| 3,368,854 | 2/1968 | Adams | 308/201 |
| 3,892,447 | 7/1975 | Gruber et al. | 308/217 |
| 3,922,037 | 11/1975 | Yamada et al. | 308/201 X |

FOREIGN PATENT DOCUMENTS

| | | | |
|---|---|---|---|
| 1261709 | 2/1968 | Fed. Rep. of Germany | 308/200 |
| 2918601 | 11/1980 | Fed. Rep. of Germany | 308/177 |
| 567556 | 2/1945 | United Kingdom . | |
| 887938 | 1/1962 | United Kingdom | 308/199 |

OTHER PUBLICATIONS

Machine Design, Oct. 13, 1966, pp. 205-223, Erwin Zaretsky.

*Primary Examiner*—Stuart S. Levy
*Assistant Examiner*—Thomas R. Hannon
*Attorney, Agent, or Firm*—Robert E. Burns; Emmanuel J. Lobato; Bruce L. Adams

[57] ABSTRACT

The prestressed rolling bearing device comprises a cage for guiding and/or retaining a plurality of rolling elements. At least one of the rolling elements has an outside diameter larger than that of the other rolling elements. The rolling element of larger diameter is formed by a ball and the other rolling elements are cylindrical elements.

10 Claims, 2 Drawing Figures

U.S. Patent  Mar. 19, 1985  4,505,523

PRESTRESSED ROLLING BEARING DEVICE

This is a continuation of application Ser. No. 256,124, filed Apr. 21, 1983 now abandoned.

The present invention relates to a rolling bearing device and more particularly to a prestressed rolling bearing.

In some applications it is often necessary to mount a rolling bearing in a prestressed condition so as to maintain a shft in position with no or substantially no radial play.

In order to satisfy these requirements, it has already been proposed to arrange rolling bearings with hollow rolling elements or to provide, on at least one rolling element, an elastic sheath whose diameter exceeds the diameter of the other rolling elements.

An object of the present invention is to permit an easy and cheap adaptation of a conventional rolling bearing to applications of the aforementioned type. The device according to the invention is of the type comprising a guiding and/or retaining cage for a plurality of rolling elements, at least one of which rolling elements has an outside diameter exceeding the outside diameter of the other rolling elements, wherein said rolling element of larger diameter comprises a ball whereas the other rolling elements are cylindrical elements.

In a first embodiment of the invention, said rolling element of larger diameter is formed by a solid steel ball of a rolling bearing.

Figure 2:
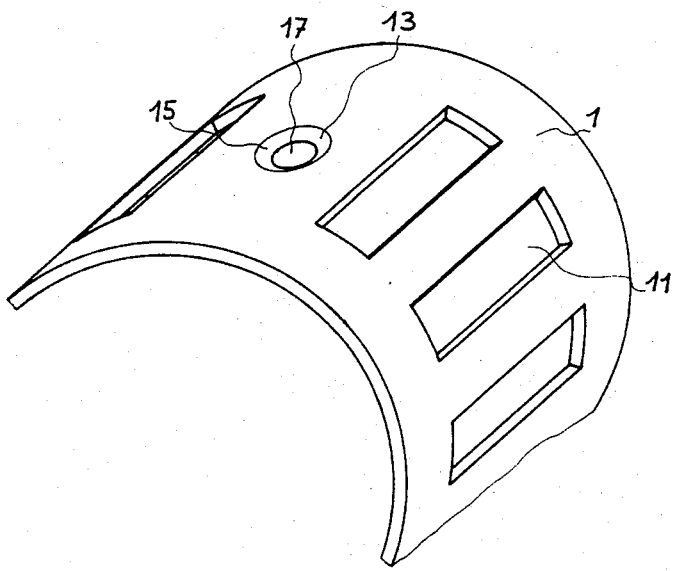

Further features and advantages of the invention will be apparent from the ensuing description of one embodiment which is given solely by way of example and shown in the accompanying drawing in which:

FIG. 1 is a radial sectional view of a rolling bearing device according to the invention, and FIG. 2 is a partial perspective view of a cage employed in the device of FIG. 1.

The rolling bearing device shown in FIG. 1 comprises a cage 1 for guiding and/or retaining a ring arrangement of rolling elements which are disposed in an annular space of radial width "d" defined by an inner raceway 3 and an outer raceway 5 obtained by machining or forming a metal sheet. The rolling elements are formed by conventional cylindrical elements such as rollers or needles 7 of diameter "d" to within operational tolerances, except for at least one rolling element, and preferably a plurality such as three rolling elements, equally spaced apart and formed by steel balls 9 of diameter "D" slightly larger than the diameter "d" of the cylindrical elements 7. This difference in diameter has been exaggerated in order to render the drawing more clear.

As the yield strength resulting from the point contact of a ball is less than that due to a linear contact of a roller or needle, it is clear that the device according to the invention provides with conventional rolling elements a prestressed rolling bearing which is capable of taking up the radial play or clearance owing to the yielding of the balls.

Depending on the extent of the clearance to be taken up, there may be employed in combination with solid rollers or needles of steel, either solid balls of steel or synthetic material or hollow balls in either material.

FIG. 2 shows an embodiment according to the invention of the guiding cage 1 for the rolling elements which is preferably made from a planar sheet of metal or a section of a tube and shaped in such manner as to comprise, owing to punching and forming operations without removal of metal, rectangular cavities 11 for guiding and possibly retaining inwardly and/or outwardly the cylindrical elements 7, and at least one cavity 13, and preferably three cavities evenly apart, each of which cavities 13 guides and if desired retains a ball 9 and is preferably in the form of a cup 15 in the shape of a part-spherical dome the centre of which is cut away at 17 so as to enable the ball to bear on the raceway 3. The cup 15 may also be formed by cutting out two substantially radial tabs which extend inwardly and are in facing relation to each other, the distance therebetween in the region of the pitch circle of the cage being in the neighbourhood of the diameter of the ball. It must be understood that in some conditions it is possible to insert two balls in the same cavity which would have a generally rectangular shape so as to simplify the manufacture of the cage.

It will be understood that the cage may have various shapes so as to ensure in addition to the guiding the inner and/or outer retention of the cylindrical rolling elements and/or the balls and may be produced by any process and in particular by a blanking and punching and forming operation or by injection of a synthetic material.

Having now described my invention what I claim as new and desire to secure by Letters Patent is:

1. In a prestressed conventional roller or needle bearing device comprising an inner raceway, an outer raceway, a plurality of rolling elements interposed between the raceways, a cage for guiding and/or retaining the rolling elements, at least one of which rolling elements having an outside diameter larger than the outside diameter of the other rolling elements; the improvement wherein said rolling element of larger diameter comprises a ball whereas the other rolling elements are rollers or needles, the ball having in a free unstressed state thereof before assembly with the inner raceway and outer raceway a diameter larger than the radial distance between the inner raceway and the outer raceway in regions of the raceways engageable by the ball so as to be subjected to compressive stress therebetween, the rollers or needles having such diameter as to be devoid of compressive stress between the inner raceway and the outer raceway, and said regions of the raceways engageable by the ball also being engageable by said rollers in bearing operation.

2. A device according to claim 1, wherein said rolling element of larger diameter is formed by a solid steel ball of a rolling bearing.

3. A device according to claim 1, wherein said rolling element of larger diameter is formed by a solid ball of a synthetic material and said rollers or needles are of metal.

4. A device according to claim 1, wherein said rolling element of larger diameter is formed by a hollow ball and said rollers or needles are solid.

5. A device according to claim 4, wherein said hollow ball is of steel.

6. A device according to claim 4, wherein said hollow ball is of synthetic material.

7. A device according to claim 1, wherein the cage defines cavities for retaining said rollers or needles and at least one cavity which is shaped for receiving said ball.

8. A device according to claim 7, wherein said ball-receiving cavity is defined by a cup portion projecting radially of the cage and having a the shape of a dome having cut-away centre part.

9. In a prestressed rolling bearing device comprising a cylindrical inner raceway having rectilinear generatrices, a cylindrical outer raceway having rectilinear generatrices, a plurality of rolling elements interposed between the two raceways, a cage for guiding the rolling elements, some of which rolling elements having an outside diameter larger than the outside diameter of the other rolling elements; the improvement wherein said rolling elements of larger diameter consist of a plurality of balls evenly spaced circumferentially of the raceway whereas the other rolling elements are cylindrical rollers or needles, the balls having in a free unstressed state thereof before assembly with the inner raceway and outer raceway a diameter larger than the radial distance between the inner raceway and the outer raceway in regions of the raceways engageable with the balls so as to be subjected to compressive stress therebetween, and the rollers or needles having such diameters as to be devoid of compressive stress between the inner raceway and the outer raceway, said regions of the raceways in contact with the balls also being engageable by the rollers or needles in bearing operation.

10. A device according to claim 9, in which there are three of said balls evenly spaced apart circumferentially of said raceways.

* * * * *